United States Patent [19]

Diaz et al.

[11] Patent Number: 4,602,920
[45] Date of Patent: Jul. 29, 1986

[54] PROCESS FOR INHIBITING HYDRATES WITH INORGANIC ELECTROLYTES WHILE PRODUCING MOIST $CO_2$ FROM SUBTERRANEAN RESERVOIRS

[75] Inventors: Zaida Diaz; Robert R. Wood, both of Houston, Tex.

[73] Assignee: Shell Western E&P Inc., Houston, Tex.

[21] Appl. No.: 717,764

[22] Filed: Mar. 29, 1985

[51] Int. Cl.$^4$ .............................................. B01D 53/14
[52] U.S. Cl. ...................................... 55/32; 166/267
[58] Field of Search ...................................... 55/29–32, 55/34, 35; 166/267

[56] References Cited

U.S. PATENT DOCUMENTS

| | | | |
|---|---|---|---|
| 1,866,560 | 7/1932 | Gordon et al. | 55/29 |
| 3,390,511 | 7/1968 | Norton | 55/35 |
| 3,403,522 | 10/1968 | Henry | 55/31 |
| 4,235,289 | 11/1980 | Weeter | 166/267 |
| 4,500,333 | 2/1985 | Blytas | 62/17 |

*Primary Examiner*—Charles Hart

[57] ABSTRACT

In producing $CO_2$ from subterranean reservoirs at conditions apt to cause both aqueous and $CO_2$-rich liquid phases to flow in pipes conveying the fluid, the formation of hydrates is prevented by adding a specified type of inorganic electrolyte hydrate inhibitor in proportions capable of maintaining an effective concentration within the aqueous liquid phase.

7 Claims, 1 Drawing Figure

PROCESS FOR INHIBITING HYDRATES WITH INORGANIC ELECTROLYTES WHILE PRODUCING MOIST CO₂ FROM SUBTERRANEAN RESERVOIRS

BACKGROUND OF THE INVENTION

The present invention relates to producing $CO_2$ from subterranean reservoirs for use at high pressures. More particularly, the invention relates to an improved process for preventing hydrate formation in $CO_2$-containing fluids being flowed from the producing wells to a $CO_2$ dehydrating facility.

U.S. Pat. No. 4,235,289 describes the production of $CO_2$ from subterranean wells for use at high pressure and recommends that the $CO_2$ be maintained in a substantially single phase supercritical state; but also indicates that a hydrate inhibitor or drying agent, e.g. ethylene glycol may be added to prevent hydrate formation from damaging the gathering line.

U.S. Pat. No. 3,676,981 describes treatment of natural gas at superatmospheric pressure and states that, with respect to such hydrocarbon gases, glycols and methyl alcohol have been found to be "the most effective hydrate inhibitors".

U.S. Pat. No. 4,478,612 by Zaida Diaz and J. H. Miller describes a process for drying at least substantially supercritical $CO_2$ with glycerol and indicates that the anomalous solvency properties of $CO_2$ near or above its critical point are such that significant savings can be attained by using glycerol as the desiccant at a relatively low temperature in order to minimize the energy required for compressing the dry $CO_2$ for use at high pressure. The disclosures of U.S. Pat. No. 4,478,612 are incorporated herein by reference.

U.S. Pat. No. 4,500,333, by G. C. Blytas describes a process for improving the drying of moist $CO_2$ at conditions above or near the critical point of $CO_2$ by contacting the $CO_2$ with an aqueous liquid electrolyte desiccant.

Commonly assigned patent application Ser. No. 706,371 filed Feb. 27, 1985 by Z. Diaz, describes a process for producing $CO_2$ from subterranean reservoirs at conditions apt to cause both aqueous and $CO_2$-rich liquid phases to flow in pipes conveying the fluid, and preventing the formation of hydrates by incorporating a polyhydric alcohol hydrate inhibitor in the fluid being piped. The disclosures of the 706,371 application are incorporated herein by reference.

SUMMARY OF THE INVENTION

The present invention relates to improving a process in which moist $CO_2$ is produced at high pressure from a subterranean reservoir, is mixed with hydrate inhibitor and is piped to a treatment facility for drying the $CO_2$ to provide a product for use at high pressure. The present improvement comprises a combination of steps. The piping of the $CO_2$-containing mixture is conducted at pressure and temperature conditions which are apt to cause the formation of an aqueous liquid phase mixed with a volume of a $CO_2$-rich liquid phase which is much greater than the volume of the aqueous liquid phase. The $CO_2$ may be present as a $CO_2$-rich liquid phase only, or as a mixture of a $CO_2$-rich liquid phase and a $CO_2$-rich vapor phase. The moist $CO_2$ being piped is mixed with sufficient hydrate inhibitor to ensure that the concentration of inhibitor remaining in any aqueous liquid phase which enters or is formed within the pipeline will be sufficient to prevent the forming of hydrates. The inhibitor used comprises at least one selected inorganic electrolyte hydrate inhibitor which, with respect to such a $CO_2$-containing mixture, is capable of inhibiting hydrate formation at substantially ambient temperature when present in the aqueous liquid phase at moderate concentration, and is soluble enough in water to provide such a concentration when added to the aqueous liquid phase in the form of an aqueous solution.

DESCRIPTION OF THE INVENTION

Figure 1:
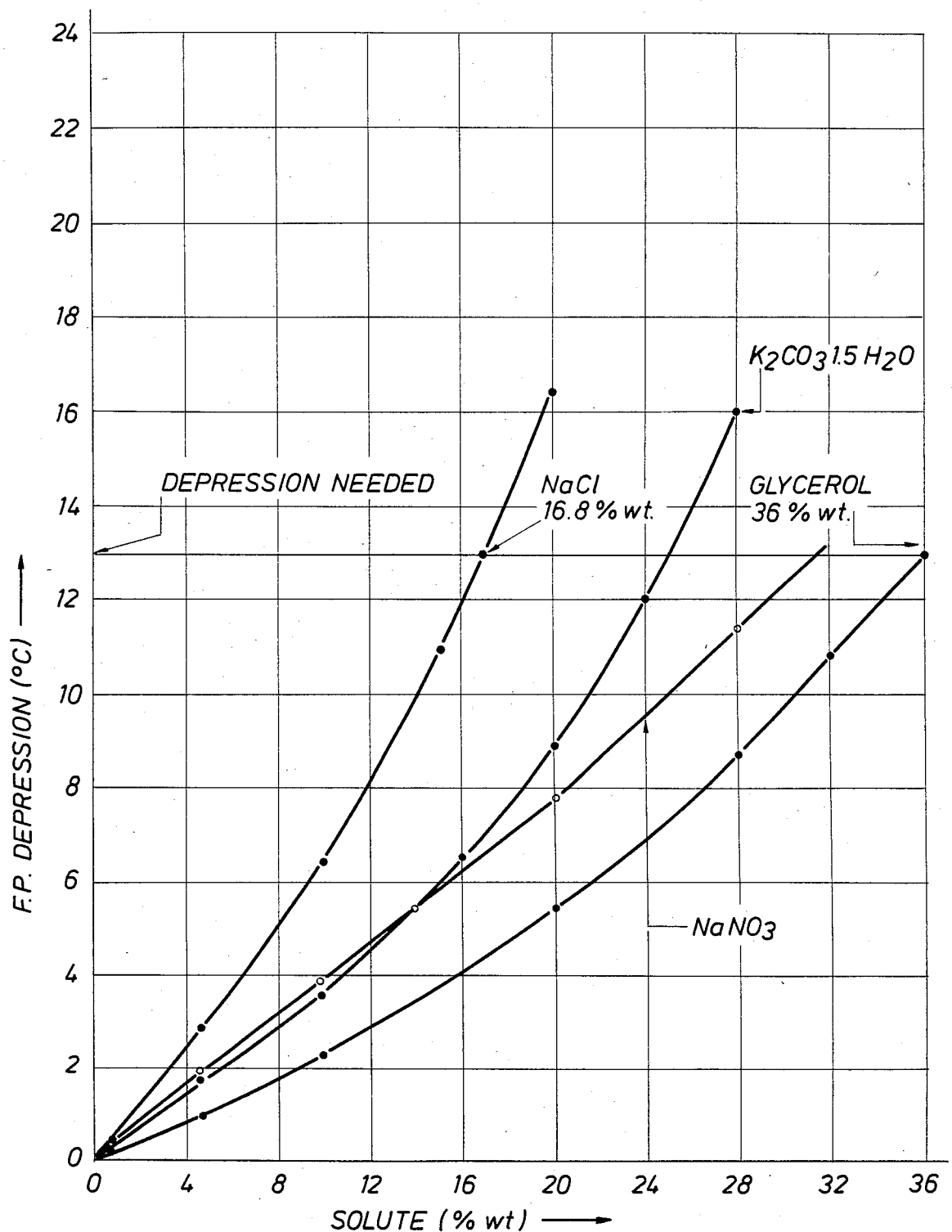
FIG. 1 shows a plot of the freezing point depression of water with increasing concentrations of freezing point depressant.

A typical subterranean reservoir from which $CO_2$ is produced may contain 98.2 percent $CO_2$, 1.6 percent nitrogen gas and 0.2 percent methane. Typical inlet and outlet conditions in the gathering system of pipes leading to a $CO_2$ drying facility are in the order of 700 psia, 50° F. and 550 psia, 32° F. respectively. At these conditions, the $CO_2$ stream exists as a mixture of liquid and vapor $CO_2$-rich phases. Such $CO_2$ is usually separated from any free water present at the inlet conditions, but it remains saturated with water throughout the line. Therefore, the pressure and temperature drop between inlet and outlet conditions results in the formation of a condensed aqueous phase in the line. Although it may be desirable to produce such $CO_2$ as a single phase supercritical fluid, in practice, numerous factors make it more desirable to operate at conditions which cause or are apt to cause the specified phase separation within the gathering system.

As indicated in the cross-referenced 4,478,612 patent and patent application 706,371, gaseous systems composed essentially of moist $CO_2$ at conditions of elevated temperatures and pressures at least approaching critical conditions exhibit relatively unpredictable solvency properties with various compounds. Applicants have now found that liquid $CO_2$-rich systems exhibit similar unpredictable solvency properties. Because of these properties, hydrate inhibitors such as methanol, which are effective in hydrocarbon systems, are unsuitable for $CO_2$ systems in which aqueous and $CO_2$-rich liquid phases are apt to be present. Previous estimates of the amount of a hydrate inhibitor (such as methanol) needed for hydrate inhibition were extrapolated from data involving a $CO_2$ phase having a volume of only about 1/10th of the volume of the aqueous phase. For this composition, the methanol loss in the liquid $CO_2$ phase is insignificant. However, these estimates are inapplicable to conditions such as those anticipated in field-scale production of $CO_2$, where the volume of $CO_2$ may be several hundred times larger than the volume of the aqueous phase. At these field conditions, the loss of an inhibitor such as methanol into a liquid $CO_2$-rich phase is very significant. It has now been found that in the order of about 180 pounds of methanol per mmscf of $CO_2$ would be required to prevent hydrate formation at the typical gathering system conditions mentioned above.

Inhibitor requirements depend on two factors: the concentration of inhibitor needed in the aqueous liquid phase to suppress hydrate formation, and the solubility of the inhibitor in the liquid $CO_2$-rich phase. A computer program known as the CSMHYD program (which was published in 1983 by D. D. Erickson in a MS thesis "Development of a Natural Gas Hydrate Prediction Program", Colorado School of Mines, Golden, Colo., 1983) was utilized to estimate the amount of hydrate inhibitors, such as monohydric and polyhydric alcohol hydrate inhibitors and inorganic electrolyte hydrate inhibitors, which would be required in the aqueous phase for various conditions of temperature, pressure, and components of produced $CO_2$.

Experimental solubility data were used to model monohydric and polyhydric alcohol-$CO_2$-water equilibria and the corresponding electrolyte equilibria and to predict the losses of the inhibitor into the liquid $CO_2$-rich phase. The electrolyte losses were found to be substantially nil.

Total inhibitor requirements were estimated by adding the aqueous phase inhibitor requirements to the inhibitor losses in the $CO_2$ phase. For the previously mentioned typical gathering system conditions for $CO_2$ produced from subterranean reservoirs, it was found that the total requirements for diethylene glycol (DEG) would be only about 19 rather than 180 pounds per mmscf $CO_2$. And, of the required 19 pounds, about 5 ppmscf will dissolve in the condensed water phase and prevent hydrate formation, with about 14 ppmscf ending up dissolved in the liquid $CO_2$ phase.

The output of the CSMHYD computer program for sodium chloride is shown in Table 1. Total sodium chloride requirements in a typical mixture case as well as in a pure $CO_2$ case are summarized in Table 2. Relatively small amounts are needed, for example, about 2 lbs. sodium chloride per mmscf $CO_2$ are needed for typical mixtures of $CO_2$, $H_2O$, $N_2$ and $CH_4$, in which about 10 lbs of water per mmscf $CO_2$ will condense in the pipeline. The sodium chloride would preferably be added as a saturated solution, rather than a solid, and the total amount of salt needed would then be about 5 lbs. per mmscf, in the form of about 2 gallons of a saturated (26% w) NaCl solution. The sodium chloride requirements for a mixture are less than those for pure $CO_2$ because of less water condensation.

TABLE 1

Hydrate Inhibition Using NaCl. Output of CSMHYD Program

| | | % w NaCl in $H_2O$ Phase | |
|---|---|---|---|
| T (°F.) | P (psia) | Pure $CO_2$ | 98.2% $CO_2$, 1.6% $N_2$, 0.2% $CH_4$ |
| 40 | 600 | 13.1 | 13.4 |
| 35 | 600 | 16.6 | 16.8 |
| 35 | 525 | 16.3 | 16.0 |

Uncertainty ± 3% w

TABLE 2

NaCl Required for Hydrate Suppression

| Gas Composition | Pure $CO_2$ | 98.2% $CO_2$ 1.6% $N_2$ 0.2% $CH_4$ |
|---|---|---|
| Inlet Conditions | 700 psia, 50° F. | 700 psia, 50° F. |
| Outlet Conditions | 550 psia, 32° F. | 550 psia, 32° F. |
| Water Condensation (lb $H_2O$/MMSCF $CO_2$) | 22 | 10 |
| Total NaCl (lb/MMSCF $CO_2$) | 4.5 | 2 |
| NaCl in $H_2O$ Phase (lb/MMSCP $CO_2$) | 4.5 | 2 |
| NaCl in $CO_2$ Phase (lb/MMSCF $CO_2$) | 0 | 0 |
| Total NaCl if used as a saturated (26% w) solution (lb/MMSCF $CO_2$) | 11 | 5 |

In view of the uncertainties involved in such estimates, a field test program was initiated. This testing required that a well be completed and operated in a reservoir in the McElmo field at a depth of approximately 8,000 feet. The well was operated to produce a fluid composed of about 98% $CO_2$ (with the remainder being nitrogen, hydrocarbon gases and water) at a rate of about 4 to 8 mmscf per day at pressures of 900 to 1000 psia and temperatures of 70 to 80° F.

A portable well test facility was utilized to measure the effects of various hydrate inhibitors. The produced fluid was flowed through a horizontal separator for removing the bulk of the produced water and providing separate streams of liquid and vapor $CO_2$. The hydrate inhibitors being tested were injected into the liquid $CO_2$ stream. The streams were combined and the resulting fluid was flowed through the coils of a heater (which was not fired) and then through a strainer, around which a bypass was arranged. Pressure measurements across the strainer and visual observations were employed to determine whether or not hydrates were formed. The flow rate of the $CO_2$ vapor and liquid streams, the conditions of pressure and temperature at the strainer, the inhibitors used, the rate of inhibitor addition, and the effective inhibitor dosage rate in pounds per mmscf as well as answers to the question of whether or not hydrates were formed, are reported in Table 3. The field data are in excellent agreement with the estimates of the sodium chloride requirements listed in Table 2.

TABLE 3

| $CO_2$ flow (MMSCF) | | Conditions at Strainer | | Inhibitor | Inhibitor Solution Injection Rate | Effective Inhibitor Dosage | Hydrates |
|---|---|---|---|---|---|---|---|
| Vapor | Liquid | P(psig) | T(°F.) | | (gal/MMSCF) | (lb/MMSCF) | Formed? |
| 4.49 | 2.86 | 630 | 43 | Methanol | 8.1 | 54 | Yes |
| 4.49 | 2.80 | 600 | 41 | Methanol | 10–11.4 | 67–76 | No |
| 2.77 | 2.32 | 605 | 41.5 | NaCl | 0.5–1.3 | 1.3–3.5 | No |
| 1.9 | 3.9 | 585 | 39 | DEG | 0.85 | 8 | No |
| 2.1 | 4.4 | 590 | 39.5 | Glycerol[(1)(2)] | 0.35 | 1.8 | No |
| 2.0 | 4.3 | 595–605 | 40–41 | Glycerol[(1)] | 3.6 | 19 | No |
| 4.43 | 2.82 | 510 | 30.5 | Methanol | 17.8 | 119 | Yes |
| 4.48 | 2.82 | 520 | 31 | Methanol | 19.5 | 131 | No |
| 4.17 | 3.0 | 520 | 30.5 | NaCl | 2.9–3.3 | 7.7–8.8 | No |
| 1.9 | 3.9 | 530 | 31 | DEG | 3.0 | 28 | No |
| 3.4 | 2.6 | 510 | 29.5 | Glycerol[(1)] | 6.3 | 33 | No |

[(1)]Glycerol injected as a solution containing 50% v Glycerol and 50% v $H_2O$.
[(2)]Data from this test may be questionable.

As indicated in Table 3, in a system such as the test system, in which the volume of liquid $CO_2$ is many times (e.g. in the order of 500 times) as large as that of the condensed water phase, the large proportion of a monohydric alcohol hydrate inhibitor, such as methanol, which is needed, would be prohibitively expensive. But, use of an electrolyte inhibitor such as sodium chloride would be comparatively very economical.

Applicants have discovered unpredictable advantages for using a particular combination of steps for producing $CO_2$ from a subterranean reservoir at conditions in which a $CO_2$-rich liquid phase is or is apt to become present (such as a pressure of at least about 500 psia and a temperature near the ambient temperature at the wellhead) and the produced $CO_2$ is piped into and dried at a central facility for supplying $CO_2$ for use at high pressure. The combination of steps comprises: (a) producing the $CO_2$ and piping it to the central facility at conditions at which both an aqueous liquid phase and a $CO_2$-rich liquid phase are apt to be present in the gathering system, (b) using an inorganic electrolyte hydrate inhibitor of the presently specified capabilities, rather than a monohydric alcohol hydrate inhibitor and (c) adding the inhibitor to the fluid being piped in a proportion sufficient to maintain in the aqueous liquid phase a concentration of inhibitor capable of preventing hydrate formation.

Sodium chloride is potentially an effective hydrate suppressant, although it may involve corrosion problems that necessitate the use of corrosion inhibitors or corrosion resistant equipment.

The CSMHYD computer program results for sodium chloride and glycerol were utilized, together with known water freezing point depression data, to identify other electrolyte hydrate inhibitors for liquid $CO_2$-rich streams. The concentrations required in the aqueous liquid phase for hydrate prevention, in percent by weight of the aqueous phase, were 16.8 for sodium chloride and 36 for glycerol. From known freezing point lowering data, such as that in the Handbook of Chemistry and Physics, it can be seen that those concentrations of sodium chloride and glycerol in an aqueous solution are capable of causing freezing point depressions of water of about 13° C. Thus, it is apparent that, for an inhibitor to be effective at the typical gathering system conditions described earlier, it should be soluble in water to an extent causing a freezing point depression of at least 13° C. FIG. 1 shows the concentrations needed of sodium chloride, potassium carbonate, glycerol and sodium nitrate. The points at which the horizontal line marked "Depression Needed" on the FIGURE intersects the curves of amount of depression versus concentration of solutes indicate the concentrations of solute needed to obtain a 13° C. depression of the freezing point of water; and thus indicate the approximate concentrations needed for hydrate inhibition in the typical $CO_2$-containing gathering system described above. The results of screening a number of salts which might be potential hydrate inhibitors for the two-liquid-phase $CO_2$-containing systems are listed in Table 4.

TABLE 4

Screening of Salts for Hydrate Suppression (non-chloride)

| Salt | Estimated Amount needed in $H_2O$ Phase to suppress hydrates (% w) | Solubility in $H_2O$ (approx. % w) | Cost (Chemical Marketing Reporter 11/14/83) |
|---|---|---|---|
| $CH_3COONa$ | 17–25 | 26 | $0.52/lb |
| $K_2CO_3.1\frac{1}{2} H_2O$ | 25 | 51 | $0.15/lb (47%, liq) |

TABLE 4-continued

Screening of Salts for Hydrate Suppression (non-chloride)

| Salt | Estimated Amount needed in $H_2O$ Phase to suppress hydrates (% w) | Solubility in $H_2O$ (approx. % w) | Cost (Chemical Marketing Reporter 11/14/83) |
|---|---|---|---|
| $NaNO_3$ | 32 | 42 | $154/ton |
| $NaHCO_3$ | 32–36 | 6 | $0.16/lb |
| $Na_2CO_3.10 H_2O$ | 32–36 | 6 | $100/ton (58% dense soda ash) |
| $Na_3PO_4.12 H_2O$ | 32–36 | 4 | $0.20/lb (anhyd.) |
| $KHCO_3$ | 32–36 | 18 | $0.14/lb |
| $KNO_3$ | 32–36 | 11 | $470/ton |
| $(NH_4)_2SO_4$ | 32–36 | 41 | $55/ton |
| $Na_2SO_4.10 H_2O$ | 32–36 | 4 | $90/ton (anhyd.) |
| $K_2SO_4$ | 32–36 | 7 | $180/ton |
| $Mg(NO_3)_2$ | ? | 38 | $0.32/lb |
| NaCl | 17 | 26 | $50/ton |

In addition to being an effective hydrate suppresant, a particularly preferred inhibitor should (a) be very soluble in water to allow operation over a wide concentration range, (b) be substantially non-corrosive and relatively inexpensive, and (c) be chemically compatible with $CO_2$-rich streams (which are apt to contain multivalent ions, such as calcium ions, capable of reacting with inorganic salts to cause precipitates or the like).

In general, substantially any inorganic electrolyte hydrate inhibitor which, with respect to a $CO_2$-containing multi-phase fluid, is capable of inhibiting hydrate formation at substantially ambient temperature when present at moderate concentration in the aqueous liquid phase, and is soluble enough in water to provide such a concentration when added to the $CO_2$-containing system in the form of an aqueous solution, can suitably be used in the present process. Sodium nitrate is highly soluble in water and relatively inexpensive. It is also unlikely to create precipitation problems with typical produced $CO_2$ streams such as those produced from the McElmo field. It is also likely to be much less corrosive than sodium chloride, although this has not yet been verified by corrosion studies. To use sodium nitrate as a saturated solution (about 42% w) for the nitrogen and methane-containing stream listed in Table 2 would require about 3 gallons per MMSCF $CO_2$. Such a solution would contain about 13 lbs of sodium nitrate. Sodium chloride and sodium nitrate exemplify particularly preferred inorganic electrolyte hydrate inhibitors for use in the present invention.

What is claimed is:

1. In a $CO_2$-producing process in which moist $CO_2$ is produced at high pressure from a subterranean well, is mixed with a hydrate inhibitor and is piped to a facility for drying $CO_2$ and subsequently supplying it for use at high pressure, an improvement for avoiding the need for producing and piping the $CO_2$ at pressure and temperatures maintaining a single phase state, comprising:

conducting said producing and piping at pressure and temperature conditions of at least about 500 psia but less than critical conditions and the ambient temperature near the wellhead which convert the fluid being piped to a fluid containing an aqueous liquid phase mixed with a $CO_2$-rich liquid phase having a volume which is many times greater than that of the aqueous liquid phase;

mixing the so produced moist $CO_2$ with sufficient hydrate inhibiter to cause the concentration remaining in said aqueous phase to be sufficient to prevent hydrate formation in spite of the amount of inhibitor which will be partitioned into a $CO_2$-rich phase; and using as said inhibitor an inorganic electrolyte hydrate inhibitor which, with respect to the $CO_2$-containing fluid being piped, is capable of inhibiting hydrate formation at substantially ambient temperature when present at moderate concentration in the aqueous liquid phase, and is soluble enough in water to provide such a concentration when added to the aqueous liquid phase in the form of an aqueous solution of the inhibitor.

2. The process of claim 1 in which a significant fraction of the $CO_2$ being piped is present as a $CO_2$-rich liquid phase, and a smaller fraction is present as a $CO_2$-rich vapor phase.

3. The process of claim 1 in which the pressure of the $CO_2$ being piped is greater than about 500 psi.

4. The process of claim 1 in which a significant proportion of water is removed from the produced $CO_2$-containing fluid before the inhibitor is added.

5. The process of claim 1 in which the inhibitor is added in the form of a relatively concentrated aqueous solution.

6. The process of claim 1 in which the hydrate inhibitor is sodium chloride.

7. The process of claim 1 in which the hydrate inhibitor is sodium nitrate.

* * * * *